United States Patent
Lee et al.

(10) Patent No.: US 10,535,270 B2
(45) Date of Patent: Jan. 14, 2020

(54) DEVICE, SERVER AND METHOD OF INFORMING LEVEL OF VEHICLE

(71) Applicants: Hyundai Motor Company, Seoul (KR); Kia Motors Corporation, Seoul (KR)

(72) Inventors: Jung Eun Lee, Seoul (KR); Bogeun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 150 days.

(21) Appl. No.: 15/832,126

(22) Filed: Dec. 5, 2017

(65) Prior Publication Data

US 2018/0165967 A1 Jun. 14, 2018

(30) Foreign Application Priority Data

Dec. 14, 2016 (KR) .................. 10-2016-0170392
Nov. 9, 2017 (KR) .................. 10-2017-0148428

(51) Int. Cl.
| | |
|---|---|
| G08G 1/00 | (2006.01) |
| G08G 1/005 | (2006.01) |
| G01C 5/06 | (2006.01) |
| G07C 5/00 | (2006.01) |
| G07C 5/08 | (2006.01) |

(52) U.S. Cl.
CPC .............. *G08G 1/20* (2013.01); *G01C 5/06* (2013.01); *G07C 5/008* (2013.01)

(58) Field of Classification Search
CPC .......... G08G 1/20; G08G 1/005; G08G 1/205; G01C 5/06; G07C 5/00; G07C 5/0825
USPC ........................................... 701/517
See application file for complete search history.

(56) References Cited

U.S. PATENT DOCUMENTS

| | | | | |
|---|---|---|---|---|
| 5,042,997 | A  * | 8/1991 | Rhodes .................. | F24F 3/00 236/44 C |
| 2010/0026503 | A1 * | 2/2010 | Proefke .................. | G01C 5/06 340/601 |
| 2017/0176601 | A1 * | 6/2017 | Nara ..................... | G01C 5/06 |

* cited by examiner

*Primary Examiner* — Yazan A Soofi
(74) *Attorney, Agent, or Firm* — Mintz Levin Cohn Ferris Glovsky and Popeo, P.C.; Peter F. Corless

(57) ABSTRACT

A level of vehicle (LOV) informing device mounted in a vehicle includes: an entrance detector determining whether the vehicle enters an entrance of a parking lot; a current location detector detecting a current location of the vehicle; an atmospheric pressure detector detecting an atmospheric pressure of the current location of the vehicle; a wireless communication unit performing wireless communication with an external device through a wireless communication network; and an LOV detector determining an LOV of the vehicle using a difference between a previous atmospheric pressure previously detected by the atmospheric pressure detector and a current atmospheric pressure currently detected by the atmospheric pressure detector, to determine the LOV of the vehicle at a parking time of the vehicle after the vehicle enters the entrance of the parking lot, and informing a user of the LOV.

14 Claims, 10 Drawing Sheets

DEVICE, SERVER AND METHOD OF INFORMING LEVEL OF VEHICLE

CROSS-REFERENCE TO RELATED APPLICATIONS

This application claims the benefit of priority to Korean Patent Application No. 10-2016-0170392 and Korean Patent Application No. 10-2017-0148428 filed in the Korean Intellectual Property Office on Dec. 14, 2016 and Nov. 9, 2017, respectively, the entire contents of which are incorporated by reference as if fully set forth herein.

BACKGROUND OF THE DISCLOSURE

(a) Field of the Disclosure

The present disclosure relates generally to vehicular technologies and, more particularly, to a level of vehicle (LOV) informing device that identifies a level on which the vehicle is parked, an LOV informing server, and a method thereof.

(b) Description of the Related Art

Due to limited available plots of land, vehicle parking has become increasingly difficult. Buildings are being built higher and basements are being built deeper underground to accommodate more vehicles. Newer buildings are using basements ten or more levels deep.

With the complexity of expanding parking lots, many drivers have, at some point, forgotten the level on which they parked their vehicle, whether in an apartment, a department store, or the like. Drivers often resort to pushing the horn keys of a key fob or remote control device in order to find their parked vehicles.

Therefore, there is a need for a device showing the parked location of a vehicle, particularly in a large facility, to assist drivers in locating their vehicles.

The above information disclosed in this Background section is only for enhancement of understanding of the background of the disclosure, and therefore it may contain information that does not form the related art.

SUMMARY OF THE DISCLOSURE

The present disclosure has been made in an effort to provide an LOV informing device, an LOV informing server, the method thereof having advantages of finding out the level where a vehicle is parked above ground or in a basement and informing a driver of the same.

In addition, embodiments of the present disclosure may be employed to accomplish other tasks not mentioned herein specifically.

According to embodiments of the present disclosure, a level of vehicle (LOV) informing device mounted in a vehicle includes: an entrance detector determining whether the vehicle enters an entrance of a parking lot; a current location detector detecting a current location of the vehicle; an atmospheric pressure detector detecting an atmospheric pressure of the current location of the vehicle; a wireless communication unit performing wireless communication with an external device through a wireless communication network; and an LOV detector determining an LOV of the vehicle using a difference between a previous atmospheric pressure previously detected by the atmospheric pressure detector and a current atmospheric pressure currently detected by the atmospheric pressure detector, to determine the LOV of the vehicle at a parking time of the vehicle after the vehicle enters the entrance of the parking lot, and informing a user of the LOV.

The previous atmospheric pressure is an atmospheric pressure at the entrance of the parking lot and the current atmospheric pressure is an atmospheric pressure at the current location of the vehicle.

The LOV detector determines the current location of the vehicle is in a basement when a difference obtained by subtracting the current atmospheric pressure from the previous atmospheric pressure is a negative value, and determines the current location of the vehicle is above ground when the difference obtained by subtracting the current atmospheric pressure from the previous atmospheric pressure is a positive value.

The LOV detector determines the LOV of the vehicle as a negative multiple when the difference obtained by subtracting the current atmospheric pressure from the previous atmospheric pressure is a negative multiple of a first predetermined value, determines the LOV of the vehicle as (a positive multiple+1) when the difference obtained by subtracting the current atmospheric pressure from the previous atmospheric pressure is a positive multiple of the first predetermined value, and determines the LOV of the vehicle as 1 when the difference obtained by subtracting the current atmospheric pressure from the previous atmospheric pressure does not reach a negative first predetermined value or a positive first predetermined value.

The LOV detector determines that the vehicle is parked on a ramp between two LOVs when an absolute value of the difference between the previous atmospheric pressure and the current atmospheric pressure is greater than or equal to a second predetermined value and is less than the first predetermined value.

The LOV informing device further includes a slope detector detecting a slope of ground on which the vehicle is parked.

The LOV detector determines that the vehicle is parked on a ramp between two LOVs when the slope of the ground on which the vehicle is parked detected by the slope detector at the parking time is greater than or equal to a predetermined slope.

The parking time of the vehicle is one of when a gear stage of the vehicle is positioned at a P-range, when the gear stage of the vehicle is positioned at an R-range, when an ignition switch of the vehicle is turned off, and a combination thereof.

The LOV informing device may further include a vehicle speed detector detecting a vehicle speed and a travel distance detector detecting a consecutive travel distance of the vehicle when an absolute value of the difference between the previous atmospheric pressure and the current atmospheric pressure is less than a second predetermined value that is less than the first predetermined value.

The LOV detector resets the LOV of the vehicle when a current vehicle speed detected by the vehicle speed detector is greater than or equal to a predetermined speed or when the consecutive travel distance detected by the travel distance detector is greater than or equal to a predetermined travel distance.

The current atmospheric pressure is an atmospheric pressure at the current location of the vehicle and the previous atmospheric pressure is an atmospheric pressure detected at a location before the vehicle reaches the current location.

The LOV informing device may further include a slope detector which detects a slope of an atmospheric pressure change based on the current atmospheric pressure and the previous atmospheric pressure.

The LOV detector detects the LOV using a current slope that is currently detected and a previous slope that is detected before detecting the current slope.

The LOV detector determines that the vehicle moves from any one LOV to a ramp between LOVs when an absolute value of the slope of the atmospheric pressure change is continuously greater than or equal to a third predetermined value, the slope of the atmospheric pressure change is a positive value or a negative value continuously for a predetermined time or predetermined number of times, the absolute value of the slope of the atmospheric pressure change is continuously greater than or equal to the third predetermined value and the slope of the atmospheric pressure change is a positive value or a negative value continuously for the predetermined time or the predetermined number of times, or a sum of the absolute value of the slope of the atmospheric pressure change for the predetermined time or the predetermined number of times is greater than or equal to a fourth predetermined value.

The LOV detector determines that the vehicle moves from the ramp between the two LOVs to any one LOV when the absolute value of the slope of the atmospheric pressure change is continuously less than a fifth predetermined value, the slope of the atmospheric pressure change changes between a positive value and a negative value for the predetermined time or the predetermined number of times, the absolute value of the slope of the atmospheric pressure change is continuously less than the fifth predetermined value and the slope of the atmospheric pressure change changes between a positive value and a negative value for the predetermined time or the predetermined number of times, or the sum of the absolute value of the slope of the atmospheric pressure change for the predetermined time or the predetermined number of times is less than a sixth predetermined value.

Furthermore, according to embodiments of the present disclosure, a level of vehicle (LOV) informing method using an LOV informing device mounted in a vehicle or a service server includes: determining whether the vehicle enters an entrance of a parking lot; detecting a current location of the vehicle; detecting an atmospheric pressure at the current location of the vehicle starting when the vehicle enters the entrance of the parking lot at a predetermined cycle time; determining an LOV of the vehicle using a difference between a previous atmospheric pressure previously detected and a current atmospheric pressure currently detected; determining the LOV of the vehicle at a parking time of the vehicle after the vehicle enters the entrance of the parking lot; and informing a user of the LOV to.

The previous atmospheric pressure is an atmospheric pressure at the entrance of the parking lot and the current atmospheric pressure is an atmospheric pressure at the current location of the vehicle.

The determining of the LOV may include: determining the current location of the vehicle is in a basement when a difference obtained by subtracting the current atmospheric pressure from the previous atmospheric pressure at the entrance of the parking lot is negative value; and determining the current location of the vehicle is above ground when the difference obtained by subtracting the current atmospheric pressure from the previous atmospheric pressure is positive value.

The determining an LOV may further include: determining the LOV of the vehicle as a negative multiple when the difference obtained by subtracting the current atmospheric pressure from the previous atmospheric pressure is a negative multiple of a first predetermined value; determining the LOV of the vehicle as (a positive multiple+1) when the difference obtained by subtracting the current atmospheric pressure from the previous atmospheric pressure is a positive multiple of the first predetermined value; and determining the LOV of the vehicle as 1 when the difference obtained by subtracting the current atmospheric pressure from the previous atmospheric pressure does not reach a negative first predetermined value or a positive first predetermined value.

The LOV informing method may further include: detecting a vehicle speed; and detecting a consecutive travel distance of the vehicle when an absolute value of the difference between the previous atmospheric pressure and the current atmospheric pressure is less than a second predetermined value that is less than the first predetermined value.

The determining of the LOV may further include resetting the LOV of the vehicle when the vehicle speed is greater than or equal to a predetermined speed or a consecutive travel distance is greater than or equal to a predetermined travel distance.

The current atmospheric pressure is an atmospheric pressure at the current location of the vehicle and the previous atmospheric pressure is an atmospheric pressure detected at a location before the vehicle reaches the current location.

The LOV informing method may further include detecting a slope of an atmospheric pressure change based on the current atmospheric pressure and the previous atmospheric pressure.

The determining an LOV is performed using a current slope that is currently detected and a previous slope that is detected just before.

The determining an LOV includes determining that the vehicle moves from any one LOV to a ramp between two LOVs if an absolute value of the slope of the atmospheric pressure change is continuously greater than or equal to a third predetermined value, the slope of the atmospheric pressure change is a positive value or a negative value continuously for a predetermined time or predetermined number of times, the absolute value of the slope of the atmospheric pressure change is continuously greater than or equal to the third predetermined value and the slope of the atmospheric pressure change is a positive value or a negative value continuously for the predetermined time or the predetermined number of times, or a sum of the absolute value of the slope of the atmospheric pressure change for the predetermined time or the predetermined number of times is greater than or equal to a fourth predetermined value.

The determining an LOV further includes determining that the vehicle moves from the ramp between the two LOVs to any one LOV if the absolute value of the slope of the atmospheric pressure change is continuously less than a fifth predetermined value, the slope of the atmospheric pressure change is changed between a positive value and a negative value for the predetermined time or the predetermined number of times, the absolute value of the slope of the atmospheric pressure change is continuously less than the fifth predetermined value and the slope of the atmospheric pressure change changes between a positive value and a negative value for the predetermined time or the predetermined number of times, or the sum of the absolute value of the slope of the atmospheric pressure change for the predetermined time or the predetermined number of times is less than a sixth predetermined value.

Furthermore, according to embodiments of the present disclosure, a level of vehicle (LOV) informing server includes: an entrance detector determining whether the vehicle enters an entrance of a parking lot based on a location information of the vehicle received from the vehicle; a slope detector receiving an atmospheric pressure of a current location of the vehicle from the vehicle and detecting a slope of an atmospheric pressure change based on a current atmospheric pressure at the current location of the vehicle and a previous atmospheric pressure detected at a location before the vehicle reaches the current location; and an LOV detector determining an LOV of the vehicle using a current slope that is currently detected and a previous slope that is detected before detecting the current slope, determining the LOV of the vehicle at a parking time of the vehicle after the vehicle enters the entrance of the parking lot, and informing a user of the LOV.

The LOV detector determines that the vehicle moves from any one LOV to a ramp between two LOVs when an absolute value of the slope of the atmospheric pressure change is continuously greater than or equal to a first predetermined value, the slope of the atmospheric pressure change is a positive value or a negative value continuously for a predetermined time or predetermined number of times, the absolute value of the slope of the atmospheric pressure change is continuously greater than or equal to the first predetermined value and the slope of the atmospheric pressure change is a positive value or a negative value continuously for the predetermined time or the predetermined number of times, or a sum of the absolute value of the slope of the atmospheric pressure change for the predetermined time or the predetermined number of times is greater than or equal to a second predetermined value.

The LOV detector determines that the vehicle moves from the ramp between the two LOVs to any one LOV when the absolute value of the slope of the atmospheric pressure change is continuously less than a third predetermined value, the slope of the atmospheric pressure change changes between a positive value and a negative value for the predetermined time or the predetermined number of times, the absolute value of the slope of the atmospheric pressure change is continuously less than the third predetermined value and the slope of the atmospheric pressure change changes between a positive value and a negative value for the predetermined time or the predetermined number of times, or the sum of the absolute value of the slope of the atmospheric pressure change for the predetermined time or the predetermined number of times is less than a fourth predetermined value.

The LOV informing server may further include an information learning unit accumulating and storing the atmospheric pressure information of individual parking levels in individual buildings through information received from the vehicle, and learning the accumulated and stored atmospheric pressure information of individual parking levels in individual buildings.

According to embodiments of the present disclosure, if a vehicle is parked in a basement or on an above-ground parking lot, an LOV can be determined accurately using an atmospheric pressure difference between the parking levels and notified to a driver. Therefore, a driver can find a parked vehicle easily.

Figure 1:
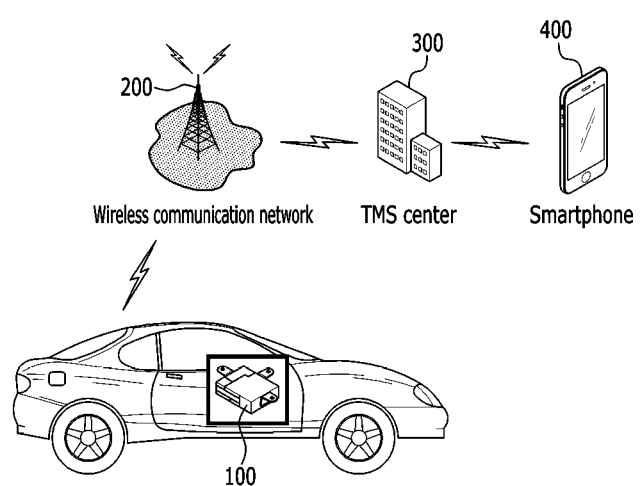
FIG. 1 is a schematic diagram of a network of an LOV informing system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

<Description of symbols>

100: LOV informing device
200: wireless communication network
300: TMS center, LOV informing server    400: smartphone
110, 320: entrance detector
120: atmospheric pressure detector
130, 380: slope detector
140: vehicle speed detector
150: wireless communication unit
160: current location detector
170: gear stage detector
180, 330: LOV detector
190: travel distance detector
310: vehicle interface unit
340: terminal interface unit    350: information learning unit
360: parking history storage    370: controller

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. To describe the present disclosure explicitly in the drawings, a part which is not related to the description is omitted and the same reference numeral is used to the same or similar constituent elements in the entire specification. Also, in the case of the generally known related art, the detailed description is omitted.

It will be further understood, unless it is explicitly described to the contrary, that the terms "comprises", "includes", "including" and/or "comprising," when used in this specification, specify the presence of stated features, integers, steps, operations, elements, and/or components, but do not preclude the presence or addition of one or more other features, integers, steps, operations, elements, components, and/or groups thereof. Also, the terminology such as " . . . portion", "module", etc. in the specification means a unit which processes at least one function or one operation, and this can be embodied by a combination of hardware or software or hardware and software.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring to the accompanying drawings, an LOV informing device, an LOV informing server and the method thereof according to embodiments of the present disclosure will hereinafter be described.

FIG. 1 is a schematic diagram of a network of an LOV informing system according to embodiments of the present disclosure. As shown in FIG. 1, an LOV informing system according to embodiments of the present disclosure includes an LOV informing device 100 which is installed inside a vehicle, a TMS (Telematics Management System) center 300 which performs data communication with the LOV informing device 100 through a wireless communication network 200, and a smartphone 400 in which an LOV informing app is installed.

The LOV informing device 100 is included in a Telematics Unit installed inside the vehicle or interworks with the Telematics Unit. As those skilled in the art would realize, the LOV informing device 100 can be formed not to be interworked with the Telematics Unit, and in this case, information which has been provided from a TMS center 300 is provided through an additional internet server. The LOV informing device 100 detects and receives information on a vehicle's current location, vehicle speed information, atmospheric pressure information, gear stage information, a travel distance, and so on. The LOV informing device 100 may include a gyro sensor, and in this case, the LOV informing device 100 can further detect information on a slope of a vehicle. Also, the LOV informing device 100 may include a geomagnetic sensor, and in this case, the LOV informing device 100 further detect information on a heading of the vehicle.

The TMS center 300 receives various information from the LOV informing device 100 by performing data communication with the LOV informing device 100 or provides various information which the LOV informing device 100 asks for. The TMS center 300 determines a parking lot where a vehicle is parked and a parking location in case that a vehicle is parked in a parking lot, and learns atmospheric pressure information received from the LOV informing device 100 in conjunction with the parking lot and the parking location. Through this learning, the TMS center 300 becomes aware of information about the atmospheric pressure of each parking level accurately.

All kind of electronic devices which are portable and able to perform wireless data communication with the TMS center 300 or the LOV informing device 100 is collectively called the smartphone 400, and the LOV informing app to receive LOV information is installed in the smartphone 400.

In the LOV informing system according to the exemplary embodiment of the present disclosure, LOV informing service which informs the LOV to a driver is provided by the LOV informing device 100 or the TMS center 300, particularly an LOV informing server of the TMS server. Reference numeral '300' is hereinafter used to represent the TMS server as well as the LOV informing server.

Referring next to FIGS. 2-6, the LOV informing service is provided by the LOV informing device 100 according to embodiments will be described.

Figure 2:
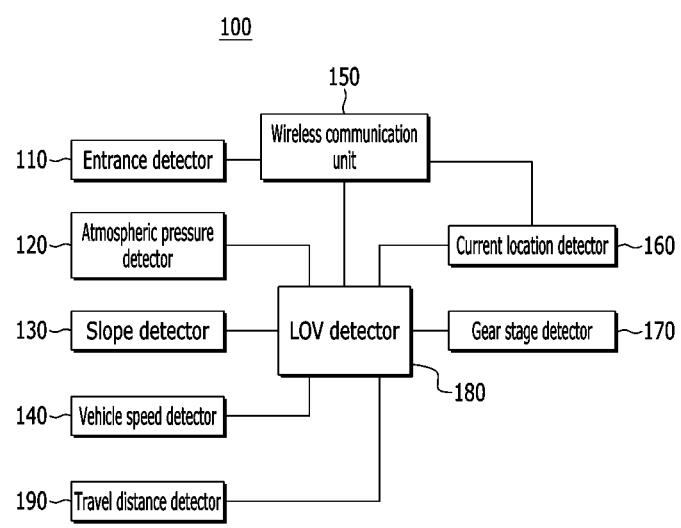
FIG. 2 is a block diagram of an LOV informing device according to embodiments of the present disclosure.

FIG. 2 is a block diagram of an LOV informing device according to embodiments of the present disclosure. As shown in FIG. 2, the LOV informing device 100 according to the embodiments of the present disclosure includes an entrance detector 110, an atmospheric pressure detector 120, a wireless communication unit 150, a current location detector 160, a gear stage detector 170 and an LOV detector 180.

In addition, to detect the level of vehicle more accurately, the LOV informing device 100 according to embodiments of the present disclosure may further include a slope detector 130, a vehicle speed detector 140 and a travel distance detector 190.

The entrance detector 110 detects a position of an entrance of a parking lot through communicating with a communication device (not shown) installed at the entrance of the parking lot, or through asking if a current location is the entrance of the parking lot to the TMS center 300 using the current location detector 160 and the wireless communication unit 140 and then receiving a response to the inquiry from the TMS center 300.

The atmospheric pressure detector 120 includes an atmospheric pressure sensor and detects an atmospheric pressure of the current location where the vehicle is positioned every predetermined time.

The slope detector 130 detects a slope of the vehicle. The slope of the vehicle is proportional to a slope of a road. Therefore, if the slope of the vehicle is continuously detected, whether the vehicle is located on a parking level or between parking levels can be determined. In addition, if a change in the slope of the vehicle is detected, whether the vehicle moves from a parking level to a ramp between parking levels or from the ramp to the parking level can be determined. Therefore, if the change in the slope of the vehicle from the entrance of the parking lot, a path through which the vehicle travels and the parking level where the vehicle finally parks can be determined.

A method of detecting the slope of the road on which the vehicle is positioned includes a first method using sensors mounted in the vehicle, a second method using the atmospheric pressure detector 120, and a third method in which the first and second methods are combined.

According to the first method, the slope detector 130 includes a gyro sensor or a slope sensor (e. g., a geomagnetic sensor), and detects the slope and a moving direction of the vehicle using the gyro sensor or the slope sensor. According to the second method, the atmospheric pressure detector 120 sequentially detects the atmospheric pressure and detects the slope of the vehicle by using the atmospheric pressure that was detected just before (hereinafter "previous atmospheric pressure") and the atmospheric pressure that is currently detected (hereinafter "current atmospheric pressure").

The vehicle speed detector 140 detects a speed of the vehicle and the travel distance detector 190 detects a consecutive travel distance of the vehicle when. a difference between the previous atmospheric pressure and the current atmospheric pressure is less than or equal to a predetermined value. The vehicle speed detector 140 and the travel distance detector 190 can be omitted.

The wireless communication unit 150 enables of performing wireless communication with the TMS center 300 through the wireless communication network 200. Also, the wireless communication unit 150 also enables wireless communication with the smartphone 400 of the driver.

The current location detector 160 is a device which detects the current location of the vehicle and can be a device which detects the current location using, i.e., GPS.

The gear stage detector 170 detects a gear stage or a shift range of the vehicle that is currently engaged. For example, the gear stage detector 170 detects whether a currently engaged shift range is a drive range (i.e., D-range), a neutral range (i.e., N-range), or a parking range (i.e., P-range).

The LOV detector 180 operates when the vehicle enters the entrance of the parking lot through the entrance detector 110, and detects the LOV (Level OF Vehicle) when the vehicle is parked using the atmospheric pressure on the ground (e.g., the atmospheric pressure at the entrance of the parking lot or the atmospheric pressure on a previous parking level) and a currently detected atmospheric pressure detected by the atmospheric pressure detector 120.

Here, the parking time may be one of a time point when a shift lever is put into the P-range, a time point when the shift lever is put into the R-range, or a time point when an ignition switch is turned off, or combinations thereof. For example, the parking time may be a time point when the ignition switch is turned off after the P-range is engaged or a time point that the ignition switch is turned off after the R-mode is engaged (regardless of the P-mode).

In addition, the LOV detector 180 is operated only when the entrance detector detects that the vehicle enters the entrance of the parking lot. The LOV detector 180 calculates a change in the slope of the vehicle by means of the sequential slopes of the vehicle detected by the slope detector 130, and determines the LOV by using the change in the slope of the vehicle.

Figure 3:
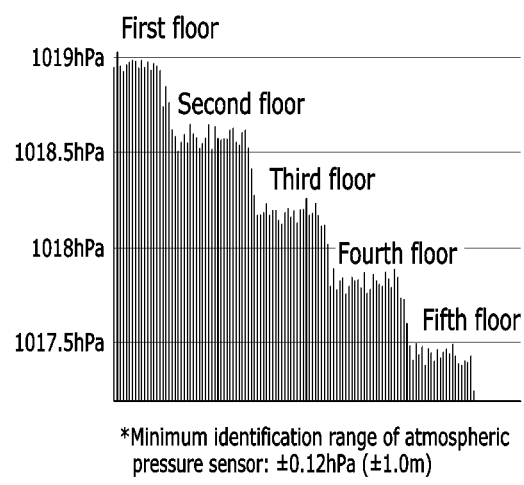
FIG. 3 is a schematic diagram illustrating atmospheric pressures at every floor in a facility detected by an atmospheric pressure detector.

Referring next to FIG. 3, a method of determining the LOV using the change in the slope of the vehicle will hereinafter be described.

In a case that the vehicle moves from the first floor to the fifth floor, the atmospheric pressures detected by the atmospheric pressure detector 120 can be represented in a form of FIG. 3. As shown in FIG. 3, if the vehicle moves on the same floor the atmospheric pressures do not change a lot. That is, a slope of a line connecting any two points corresponding to the same floor may be "0" or a very small value. In addition, the slope may continuously change between a positive value and a negative value and converge to "0".

On the contrary, if the vehicle moves between the neighboring floors, that is the vehicle moves from any one floor to the ramp or from the ramp to any one floor, a slope of a change of the atmospheric pressure is large, compared to the slope of the change of the atmospheric pressure when the vehicle moves on the same floor. The slope of the change of the atmospheric pressure may be continuously a positive value or a negative value. That is, if the vehicle moves upwardly the slope of the change of the atmospheric pressure may be continuously a negative value, but if the vehicle moves downwardly the slope of the change of the atmospheric pressure may be continuously a positive value.

Therefore, if the slope of the change of the atmospheric pressure is continuously detected, it can be determined that the vehicle is located on the parking floor or moves between the neighboring floors.

The LOV detector 180 calculates the slope of the change of the atmospheric pressure, determines whether a first condition is satisfied to determine whether the vehicle moves from any one floor to the ramp, and determines whether a second condition is satisfied to determine whether the vehicle moves from the ramp to any one floor.

The first condition is satisfied when an absolute value of the slope of the atmospheric pressure change is continuously greater than or equal to a first predetermined value, the slope of the atmospheric pressure change is a positive value or a negative value continuously for a predetermined time or predetermined number of times, the absolute value of the slope of the atmospheric pressure change is continuously greater than or equal to the first predetermined value and the slope of the atmospheric pressure change is a positive value or a negative value continuously for the predetermined time or the predetermined number of times, or a sum of the absolute value of the slope of the atmospheric pressure change for the predetermined time or the predetermined number of times is greater than or equal to a predetermined value.

The second condition is satisfied when the absolute value of the slope of the atmospheric pressure change is continuously less than a second predetermined value, the slope of the atmospheric pressure change is changed between a positive value and a negative value for the predetermined time or the predetermined number of times, the absolute value of the slope of the atmospheric pressure change is continuously less than the second predetermined value and the slope of the atmospheric pressure change is changed between a positive value and a negative value for the predetermined time or the predetermined number of times, or the sum of the absolute value of the slope of the atmospheric pressure change for the predetermined time or the predetermined number of times is less than a predetermined value.

In the meantime, instead of detecting the slope of the atmospheric pressure change, a difference between the previous atmospheric pressure and the current atmospheric pressure can be detected to determine whether the vehicle is located on the parking floor or moves between the neighboring floors. In this case, the difference between the previous atmospheric pressure and the current atmospheric pressure is compared with a difference between the previous atmospheric pressure and a further previous atmospheric pressure.

In addition, the LOV detector 180 can detect if a vehicle is driving on a road after getting out of an exit of the parking lot using the travel distance detector 190 and the vehicle speed detector 140, and in this case, the LOV detector 180 resets LOV value.

The travel distance detector 190 detects the travel distance of the vehicle.

FIG. 3 is a schematic diagram illustrating atmospheric pressures at every floor in a facility detected by the atmospheric pressure detector. In FIG. 3, a vertical axis represents the atmospheric pressure and a horizontal axis represents a detecting time of the atmospheric pressure.

As shown in FIG. 3, if it is assumed that a floor height is 4 m and atmospheric pressure on the first floor is 1019 hPa (hectopascal), atmospheric pressure on the second floor is 1018.5 hPa, atmospheric pressure on the third floor is 1018 hPa, and atmospheric pressure on the fourth floor 1017.5 hPa.

Therefore, according to the atmospheric pressures detected by the atmospheric pressure detector 120, there is ±0.12 hPa atmospheric pressure difference per about 1.0 m height. In more detail, the higher a level is, the lower the atmospheric pressure is, and vice versa. Therefore, atmospheric pressure of basement parking level is higher than that of the entrance of the parking lot, and atmospheric pressure of the ground parking level is lower than that of the entrance of the parking lot.

Figure 4:
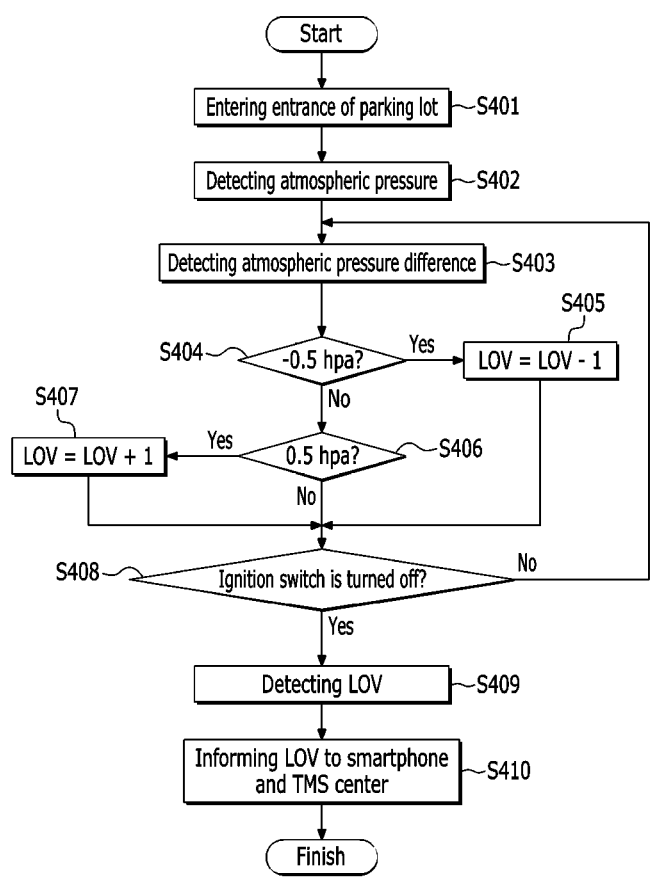
FIG. 4 is a drawing which shows an LOV informing method by an LOV informing device according to the first exemplary embodiment of the present disclosure.

FIG. 4 is a drawing which shows an LOV informing method by an LOV informing device according to the first exemplary embodiment of the present disclosure. As shown in FIG. 4, the LOV informing device 100 detects that the vehicle enters the parking lot when the vehicle enters the entrance of the parking lot of a building at step S401.

At this time, there are two methods to detect vehicle's entering the parking lot. The first method is a vehicle's autonomous detection and the second method is using the TMS center 300.

The first method uses the number of GPS signals and the gyro sensor, i.e., the slope detector 130. In detail, if the vehicle enters the ground level or the basement parking lot, the numbers of GPS signals received from the current location detector 160 decreases significantly, and the slope of the vehicle detected by the slope detector 130 is a predetermined slope or more. For example, about 8 GPS signals are received on the road (i.e., no obstacles to receive GPS signals on top of the vehicle), but when the vehicle enters the above-ground or the basement parking lot, the numbers of GPS signals decreases to 5 and less, and after the vehicle enters the basement parking lot completely, GPS signals are not received. Therefore, if the numbers of GPS signals received from the current location detector 160 are 5 or less (not limited to this) and the vehicle slope becomes the predetermined slope or more, the LOV informing device 100 determines that the vehicle enters the entrance of the parking lot. In the meanwhile, in case that the LOV informing device 100 interworks with a navigation system device installed in the vehicle (or the smartphone which has a navigation system function), the current location can be detected more accurately and whether the vehicle enters the parking lot can be detected more accurately.

In the second method, the TMS center 300 (i.e., the LOV informing server 300 of TMS center) identifies a building or a POI (Point Of Interest) where the vehicle is located through the information on the current location of the vehicle received from the current location detector 160 every predetermined cycle time, and determines whether the vehicle enters the parking lot through the slope of the vehicle received from the slope detector 130 or the atmospheric pressure received from the atmospheric pressure detector 120, and informs vehicle's entrance to the LOV informing device 100 if it is determined that the vehicle enters the parking lot. At this time, the TMS center 300 can provide the information about the parking lot of a facility to the LOV informing device 100.

Once the vehicle enters the entrance of the parking lot, the LOV detector 180 of the LOV informing device 100 is activated and detects the atmospheric pressure of the entrance of the parking lot through the atmospheric pressure detector 120 at step S402. Also, the LOV detector 180 detects the atmospheric pressure of the current location through the atmospheric pressure detector 120 continuously every predetermined cycle time, and calculates an atmospheric pressure difference between the current location and the entrance of the parking lot (atmospheric pressure of the entrance of the parking lot—the atmospheric pressure of the current location) at step S403.

The LOV detector 180 determines whether the detected atmospheric pressure difference reaches −0.5 hPa at step S404, and if the atmospheric pressure difference reaches −0.5 hPa, "−1" is added to the LOV at step S405. Accordingly, the LOV detector 180 determines the current location of the vehicle is the first basement level. On the other hand, the LOV detector 180 determines whether the detected atmospheric pressure difference reaches 0.5 hPa at step S406 if the atmospheric pressure of the current location becomes lower than that of the entrance of the parking lot, and if the atmospheric pressure difference reaches 0.5 hPa, "1" is added to the LOV at step S407. Accordingly, the LOV detector 180 determines the current location of the vehicle is the second level at step S407.

Here, if the LOV is a negative number, absolute value of the LOV is the basement level, and if the LOV is a positive number, the value which 1 is added to the LOV is the ground level.

Also, as 0.5 hPa which is a standard of detecting the LOV is suggested as an example, if floor height is high, the value will be set bigger than 0.5 hPa, and if floor height is low, the value will be set smaller than 0.5 hPa Once the LOV detector 180 detects the current LOV, the LOV detector 180 determines whether the ignition switch of the vehicle is turned off at step S408. If the ignition switch of the vehicle is not turned off, the LOV detector 180 repeats the step S404 to the step S407. Accordingly, a vehicle's moving situation to the first basement floor, the second basement floor, and so on or the first floor, the second floor, and so on is detected.

If the ignition switch of the vehicle is turned off at the step S408, the LOV detector 180 determines the finally detected LOV as a vehicle's parked LOV at step S409. In addition to the step S409, the LOV detector 180 can determine the LOV more precisely using the gear stage detector 170. In other words, if the gear stage detector 170 detects that the gear stage is positioned at the P-range after it is positioned at the R-range for more than predetermined time before the ignition switch of the vehicle is turned off, the LOV detector 180 determines the time when the gear stage is positioned at the R-range as an actual parking time (applicable to rear parking). Surely, in case that the gear stage is positioned at the P-range after it is positioned at the D-range within predetermined time before the ignition switch of the vehicle is turned off, the LOV detector 180 determines vehicle's head-on parking.

After the LOV which the vehicle is finally parked is determined, the LOV detector 180 informs the information on the determined LOV to the smartphone 400 of the driver and helps the driver find out the LOV at step S410. Certainly, the LOV detector 180 can provide the information on the LOV to the TMS center 300.

Figure 5:
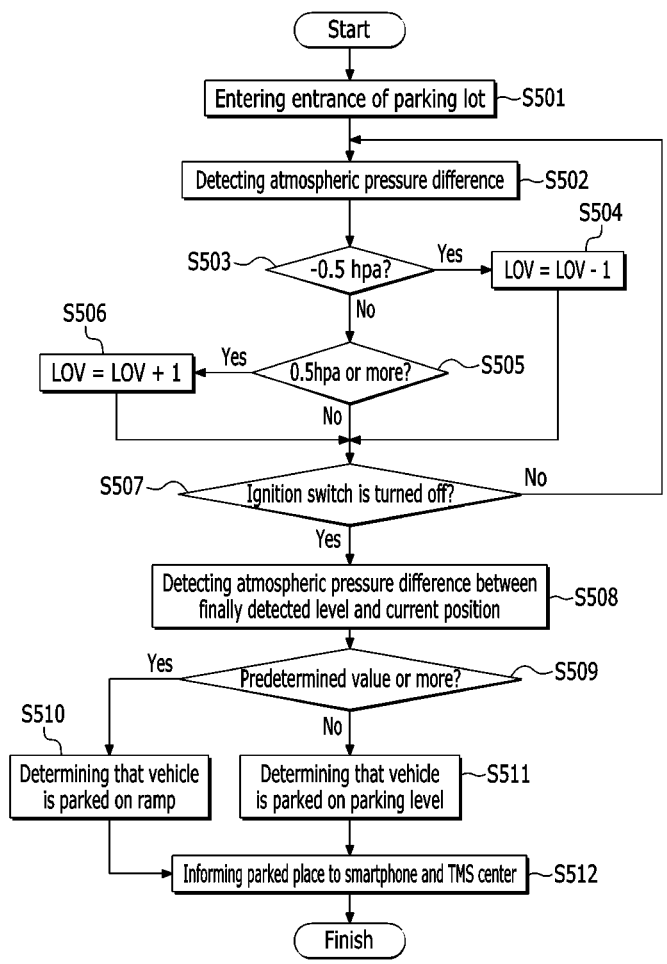
FIG. 5 is a drawing which shows an LOV informing method by an LOV informing device according to the second exemplary embodiment of the present disclosure.

FIG. 5 is a drawing which shows an LOV informing method by an LOV informing device according to the second exemplary embodiment of the present disclosure.

The first exemplary embodiment of the present disclosure which is described referring to FIG. 4 relates to a LOV informing method performed when the vehicle is parked on the LOV. However, if the parking lot is crowded, the driver may park the vehicle on the ramp between parking levels. The second exemplary embodiment of the present disclosure relates to a case that the vehicle is parked on the ramp.

As shown in FIG. 5, the LOV informing device 100 detects that the vehicle is entering the parking lot when the vehicle enters the entrance of the parking lot of a facility at step S501.

When the vehicle enters the entrance of the parking lot, the LOV detector 180 of the LOV informing device 100 is activated and detects the atmospheric pressure of the entrance of the parking lot through the atmospheric pressure detector 120. Also, the LOV detector 180 detects the atmospheric pressure through the atmospheric pressure detector 120 continuously every predetermined cycle time, and detects the atmospheric pressure difference between the current location and the entrance of the parking lot (atmospheric pressure of the entrance of the parking lot—the atmospheric pressure of the current location) at step S502.

The LOV detector 180 determines whether the detected atmospheric pressure difference reaches −0.5 hPa at step S503, and if the atmospheric pressure difference reaches −0.5 hPa, "−1" is added to the LOV. Accordingly, the LOV detector 180 determines the current location of the vehicle is the first basement level at step S504. On the other hand, the LOV detector 180 determines whether the detected atmospheric pressure difference reaches 0.5 hPa if the atmospheric pressure of the current location becomes lower than that of the entrance of the parking lot at step S505, and if the atmospheric pressure difference reaches 0.5 hPa, "1" is added to the LOV at step S506. Accordingly, the LOV detector 180 determines the current location of the vehicle is the second level at step S507.

Here, if the LOV is a negative number, absolute value of the LOV is the basement level, and if the LOV is a positive number, the value which 1 is added to the LOV is the ground level (i.e., above ground).

Once the LOV detector 180 detects the current LOV, the LOV detector 180 determines whether the ignition switch of the vehicle is turned off at step S507. If the ignition switch of the vehicle is not turned off, the LOV detector 180 repeats the step S503 to the step S506. Accordingly, a vehicle's moving situation to the first basement floor, the second basement floor, and so on or the first floor, the second floor, and so on is detected.

At the step S507, if the ignition switch is turned off, the LOV detector 180 determines whether the vehicle is parked on the ramp in the parking lot. To this end, the LOV detector 180 calculates the difference between the atmospheric pressure of the finally detected LOV (i.e., the current level on which the vehicle is located) and currently detected atmospheric pressure (hereinafter, "atmospheric pressure difference") at step S508, and determines whether the atmospheric pressure difference is predetermined value or more at step S509.

The LOV detector 180 determines that the vehicle is parked on the ramp in the parking lot at step S510 if the atmospheric pressure difference is the predetermined value or more, and determines that the vehicle is parked on the parking level at step S511 if the atmospheric pressure difference is smaller than the predetermined value.

When the LOV detector 180 determines a finally parked place of the vehicle (i.e., the LOV or the ramp of the related LOV), the LOV detector 180 informs the determined place to the smartphone 400 of the driver and helps the driver find out the place of the parked vehicle at step S512. Surely, the LOV detector 180 can provide information of the parked place to the TMS center 300.

Meanwhile, according to embodiments of the present disclosure, the LOV detector 180 can determine whether the vehicle is parked on the ramp in the parking lot using the slope detector 130. In this case, the LOV detector 180 receives the slope of the vehicle from the slope detector 130 at step S508, and determines whether the slope of the vehicle is a predetermined slope or more. Then, if the slope of the vehicle is smaller than the predetermined slope, the LOV detector 180 determines that the vehicle is parked on the parking level, and if the slope of the vehicle is the predetermined slope or more, the LOV detector 180 determines that the vehicle is parked on the ramp in the parking lot.

Figure 6:
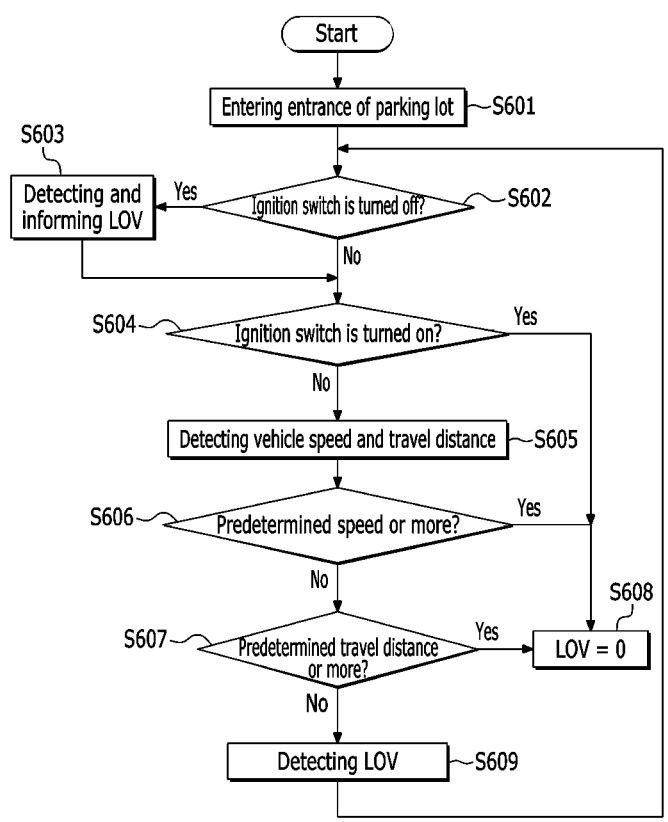
FIG. 6 is a flowchart which shows an LOV reset method according to embodiments of the present disclosure.

FIG. 6 is a flowchart which shows an LOV reset method according to embodiments of the present disclosure. As shown in FIG. 6, after the vehicle enters the entrance of the parking lot at step S601, the LOV detector 180 determines whether the ignition switch is turned off or the gear stage is positioned at the P-range at step S602. If the ignition switch is turned off or the gear stage is positioned at the P-range, the LOV detector 180 determines the current level is the LOV, and sends information on the LOV to the smartphone 400 or the TMS center 300 at step S603.

In the meantime, if the vehicle keeps operating without turning off the ignition switch after entering the entrance of the parking lot, the LOV detector 180 detects the vehicle speed and the travel distance by receiving information on the vehicle speed and the travel distance from the vehicle speed detector 140 and the travel distance detector 190 at step S605. If the vehicle speed is greater than or equal to a predetermined speed (i.e. 30 Km/h or 40 Km/h, and so on) at step S606 or the travel distance is larger than a predetermined travel distance (i.e. 2 Km or 3 Km, and so on) at step S607, the LOV detector 180 determines that the vehicle is outside or is not willing to park, and resets the LOV to be '0' at step S608.

Under the condition that the LOV detector 180 determines the LOV and sends the information on the LOV to the smartphone 400 or the TMS center 300 at the step S603, if the LOV detector 180 receives ignition-on signal at step S604, the LOV detector 180 resets the LOV value at the step S608. In this case, the LOV detector 180 may repeat the step S605 to the step S607 before the LOV detector 180 resets the LOV value. In other words, in case that the vehicle speed is greater than or equal to the predetermined speed and the travel distance is larger than or equal to the predetermined travel distance, the LOV detector 180 can reset the LOV value.

Next, an example in which the LOV informing service is provided by the TMS center 300 will be described, referring to FIGS. 7 and 8.

Before a description, the TMS center 300, more specifically the LOV informing server in the TMS center, can provide the LOV informing service. For better comprehension and ease of description, the LOV informing service provided by the LOV informing server 300 in the TMS center will be described below. However, the TMS center does not always include the LOV informing server 300, and another server in the TMS center may provide the LOV informing service.

Figure 7:
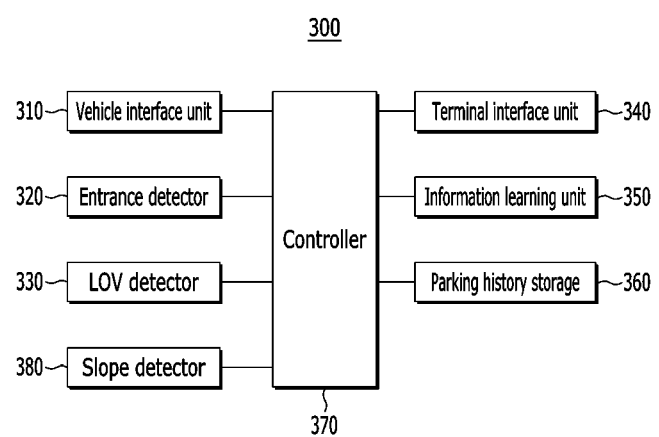
FIG. 7 is a block diagram of an LOV informing server according to embodiments of the present disclosure.

FIG. 7 is a block diagram of an LOV informing server according to embodiments of the present disclosure. As shown in FIG. 7, the LOV informing server 300 according to embodiments of the present disclosure includes a vehicle interface unit 310, the entrance detector 320, the LOV detector 330, a terminal interface unit 340, an information learning unit 350, a parking history storage 360, and a controller 370. In addition, the LOV informing server 300 may further include the slope detector 380.

The vehicle interface unit 310 enables of wireless communication with the wireless communication unit 150 of the LOV informing device 100, and the terminal interface unit 340 enables of wireless communication with the smartphone 400 of the driver.

The entrance detector 320 determines that the vehicle enters an entrance of which facility's parking lot by comparing information on the current location of the vehicle received from the LOV informing device 100 with stored map information.

The LOV detector 330 is activated when the vehicle enters the entrance of the parking lot through the entrance detector 110, and determines the LOV using the atmospheric pressure information received from the LOV informing device 100. The LOV determination using the atmospheric pressure information performed by the LOV detector 330 in the LOV informing server 300 is the same as the LOV determination using the atmospheric pressure information performed by the LOV detector 180 in the LOV informing device 100. In addition, the LOV detector 330 can determine whether the vehicle is parked on the ramp in the parking lot using the atmospheric pressure information and/or the information of the slope of the vehicle received from the LOV informing device 100.

The information learning unit 350 accumulates and stores the atmospheric pressure information of individual parking levels in individual buildings through the information received from the LOV informing device 100 which is installed in individual vehicles. The information learning unit 350 learns the accumulated and stored atmospheric pressure information of individual parking levels in individual buildings, and determines specific atmospheric pressures of individual parking levels in individual buildings. The parking history storage 360 stores the LOV information received from the LOV informing device 100 which is installed in individual vehicles. Accordingly, history of when or where a vehicle is parked by whom (i.e., driver) or which vehicle is parked is stored. The controller 370 controls entire operations of individual components.

The slope detector 380 detects or calculates the slope of the vehicle based on the atmospheric pressure at the current location of the vehicle received from the vehicle and transmits the slope of the vehicle to the LOV detector 330. In further detail, the slope detector 380 detects the slope of the vehicle based on the difference between the previous atmospheric pressure and the current atmospheric pressure.

The LOV detector 330 calculates the change in the slope of the vehicle based on the slope of the vehicle detected by the slope detector 380, and determines the LOV based on the change in the slope of the vehicle. A method of determining the LOV performed by the LOV detector 330 is the same as the method of determining the LOV performed by the LOV detector of the LOV informing device.

Figure 8:
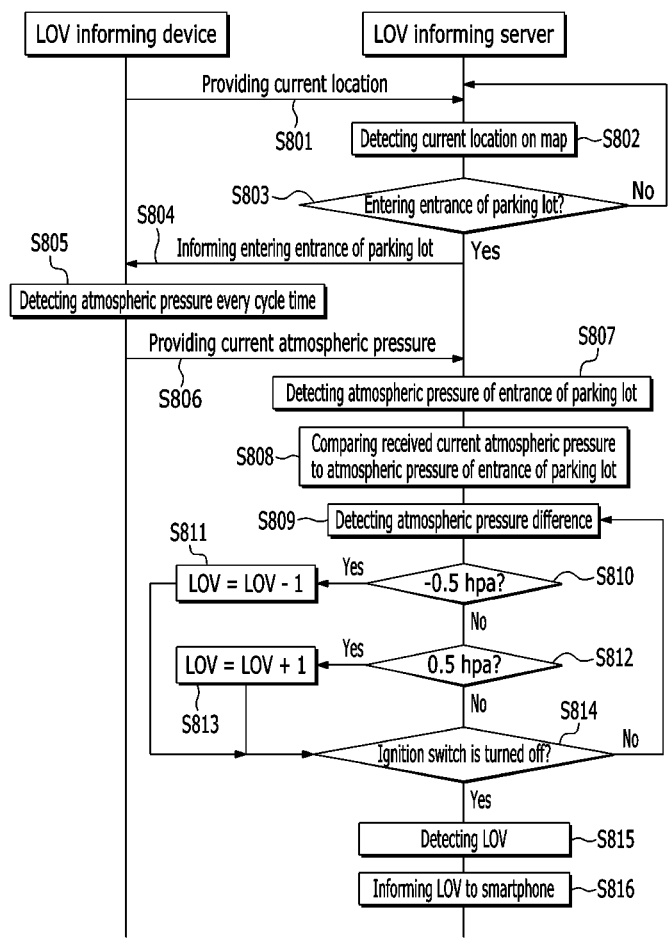
FIG. 8 is a flowchart which shows an LOV informing method according to the third exemplary embodiment of the present disclosure.

FIG. 8 is a flowchart which shows an LOV informing method according to the third exemplary embodiment of the present disclosure, and the LOV informing method is performed by an LOV informing server. As shown in FIG. 8, the LOV informing device 100 determines the current location of the vehicle every predetermined cycle time and provides the current location of the vehicle to the LOV informing server 300 at step S801.

The LOV informing server 300 determines the current location of the vehicle on map information by matching the received current location of the vehicle with the map information which is already stored in the LOV informing server 300 at step S802, and determines whether the current location of the vehicle is the entrance of the parking lot of the building at step S803. The LOV informing server 300 identifies and stores the building if the current location of the vehicle is the entrance of the parking lot entrance of the building, and informs the vehicle' entering the entrance of the parking lot to the LOV informing device 100 at step S804.

The LOV informing device 100 detects the atmospheric pressure every predetermined cycle time if it receives information that the vehicle is entering the entrance of the parking lot from the LOV informing server 300 at step S805, and provides the detected atmospheric pressure to the LOV informing server 300 at step S806.

The LOV informing server 300 determines and stores initially received atmospheric pressure as the atmospheric pressure of the entrance of the parking lot at step S807. The LOV informing server 300 compares the atmospheric pressure which is received since then to the atmospheric pressure of the entrance of the parking lot at step S808. Then, the LOV informing server 300 calculates the difference between the atmospheric pressure of the entrance of the parking lot and the currently detected atmospheric pressure (atmospheric pressure of the entrance of the parking lot—currently detected atmospheric pressure) at step S809.

The LOV informing server 300 determines whether the calculated atmospheric pressure difference reaches −0.5 hPa at step S810, and if the atmospheric pressure difference reaches −0.5 hPa, "−1" is added to the LOV. Therefore, the LOV informing server 300 determines the current location of the vehicle is the first basement level at step S811. In the meanwhile, the LOV informing server 300 determines whether the calculated atmospheric pressure difference reaches 0.5 hPa if the atmospheric pressure of the current location becomes lower than that of the entrance of the parking lot at step S812, and if the atmospheric pressure difference reaches 0.5 hPa, the LOV informing server 300 adds "1" to the LOV at step S813. Accordingly, the LOV informing server 300 determines the current location of the vehicle is the second level at step S813.

Here, if the LOV is a negative number, absolute value of the LOV is the basement level, and if the LOV is a positive number, the value which 1 is added to the LOV is the ground level (i.e., above ground).

Once the LOV informing server 300 detects the current LOV, the LOV informing server 300 determines whether the ignition switch of the vehicle is turned off at step S814. If the ignition switch of the vehicle is not turned off, the LOV informing server 300 repeats the step S810 to the step S813. Accordingly, a vehicle's moving situation to the first basement floor, the second basement floor, and so on or the first floor, the second floor, and so on is detected.

If the ignition switch of the vehicle is turned off at the step S814, the LOV informing server 300 determines the finally detected LOV as the parked LOV of the vehicle at step S815. At this time, in addition to the step S814, the LOV informing server 300 can determine the LOV where the vehicle is parked more precisely using the gear stage information received from the LOV informing device 100. In other words, if the LOV informing server 300 detects that the gear stage is positioned at the P-range after being positioned at the R-range for more than a predetermined time, the LOV informing server 300 determines the time when the gear stage is positioned at the P-range as an actual parking time (applicable to rear parking). Surely, in case that the gear stage is positioned at the P-range after being positioned at the D-range within a predetermined time before the ignition switch of the vehicle is turned off, the LOV informing server 300 determines the vehicle's head-on parking.

After the LOV where the vehicle is finally parked is determined, the LOV informing server 300 informs the information of the determined LOV to the smartphone 400 of the driver and helps the driver find out the LOV at step S816. The LOV informing server 300 may provide the information of the LOV to the smartphone 400 through the LOV informing device 100.

The above-described embodiments are related to the method of determining the LOV based on the difference between the atmospheric pressure at the current location and the atmospheric pressure of the entrance. A method of determining the LOV based on the change in the slope of the vehicle calculated from the current atmospheric pressure and the previous atmospheric pressure will hereinafter be described with reference to FIGS. 9 and 10.

Figure 9:
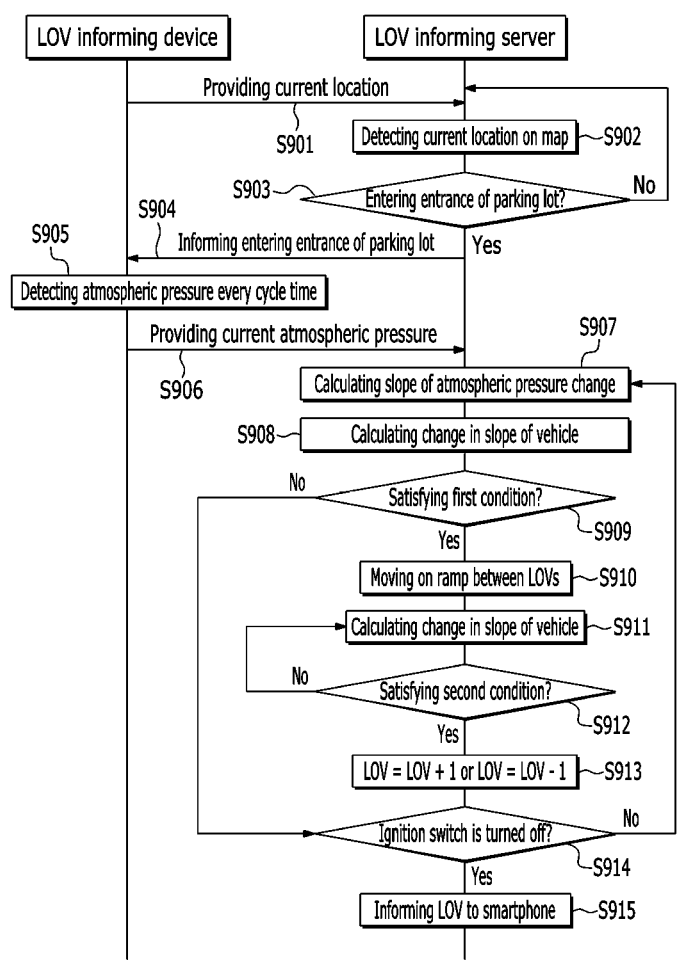
FIG. 9 is a flowchart which shows an LOV informing method according to the fourth exemplary embodiment of the present disclosure.

FIG. 9 is a flowchart which shows an LOV informing method according to the fourth exemplary embodiment of the present disclosure, and the LOV informing method is performed by the LOV informing server 300.

The entrance detector 320 of the LOV informing server 300 determines the current location of the vehicle on map information by matching the received current location of the vehicle with the map information which is already stored in the LOV informing server 300 at step S902, and determines whether the current location of the vehicle is the entrance of the parking lot of the building at step S903. The entrance detector 320 identifies the building if the current location of the vehicle is the entrance of the parking lot entrance of the building, and informs the vehicle' entering the entrance of the parking lot to the LOV informing device 100 at step S904.

The LOV informing device 100 detects the atmospheric pressure every predetermined cycle time if it receives information that the vehicle is entering the entrance of the parking lot from the LOV informing server 300 at step S905, and provides the detected atmospheric pressure to the LOV informing server 300 at step S906.

The LOV informing server 300 determines and stores initially received atmospheric pressure as the atmospheric pressure of the entrance of the parking lot. The slope detector 380 calculates the slope of the atmospheric pressure change based on the current atmospheric pressure and the previous atmospheric pressure at step S907 and transmits the slope to the LOV detector 330.

The LOV detector 330 determines the slope transmitted from the slope detector 380 as the slope of the vehicle, and sequentially calculates the change in the slope of the vehicle at step S908 based on the currently received slope (hereinafter "current slope") and the previously received slope (hereinafter "previous slope").

After that, the LOV detector 330 determines whether the first condition is satisfied at step S909. If the first condition is satisfied, the LOV detector 330 determines that the vehicle moves on the ramp between LOVs at step S910 and continuously calculates the change in the slope of the vehicle at step S911. On the contrary, if the first condition is not satisfied, it is determined whether the ignition switch is turned off at step S914. If the ignition switch is not turned off, the LOV informing server 300 repeats the step S907 to the step S909.

If the LOV detector 330 determines that the vehicle moves on the ramp between LOVs, the LOV detector determines whether the second condition is satisfied at step S912. If the second condition is satisfied, the LOV detector 330 determines that the vehicle moves from the ramp to the parking floor and add "1" or "−1" to the LOV at step S913. Herein, which one of "1" and "−1" is added depends on a sign of the slope of the vehicle.

If the LOV detector 330 determines the current LOV, the LOV detector determines whether the ignition switch is turned off at the step S914. If the ignition switch is not turned off, the method returns to the step S907 and repeats the step S907 to the step S914 to determine whether the vehicle moves to the next parking floor.

If the ignition switch is turned off at the step S914, the LOV detector 330 determines the finally detected LOV as the parked LOV of the vehicle and informs the information of the determined LOV to the smartphone 400 of the driver to help the driver find out the LOV at step S915.

Figure 10:
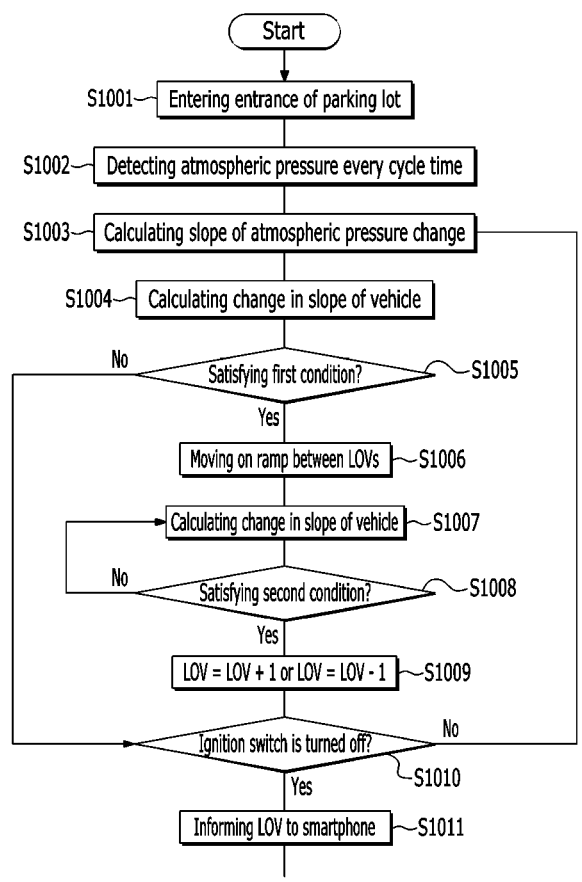
FIG. 10 is a flowchart which shows an LOV informing method according to the fifth exemplary embodiment of the present disclosure.

FIG. 10 is a flowchart which shows an LOV informing method according to the fifth exemplary embodiment of the present disclosure, and the LOV informing method is performed by the LOV informing device.

As shown in FIG. 10, the LOV informing device 100 detects that the vehicle is entering the parking lot when the vehicle enters the entrance of the parking lot of a facility at step S1001.

When the vehicle enters the entrance of the parking lot, the atmospheric pressure detector 120 of the LOV informing device 100 detects the atmospheric pressure every predetermined cycle time and transmits the detected atmospheric pressure to the slope detector at step S1002.

If the slope detector 130 receives the atmospheric pressure from the atmospheric pressure detector 120, the slope detector 130 calculates the slope of the atmospheric pressure change (i.e., the slope of the vehicle) based on the current atmospheric pressure and the previous atmospheric pressure, and transmits the calculated slope of the vehicle to the LOV detector 180 at step S1003.

The LOV detector 180 sequentially calculates the change in the slope of the vehicle at step S1004 based on the currently received slope (hereinafter "current slope") and the previously received slope (hereinafter "previous slope"). After that, the LOV detector 180 determines whether the first condition is satisfied at step S1005.

If the first condition is satisfied, the LOV detector 180 determines that the vehicle moves on the ramp between LOVs at step S1006 and continuously calculates the change in the slope of the vehicle at step S1007. On the contrary, if the first condition is not satisfied, it is determined whether the ignition switch is turned off at step S1010. If the ignition switch is not turned off, the LOV informing device 100 returns to the step S1003.

If the LOV detector 180 determines that the vehicle moves on the ramp between LOVs, the LOV detector determines whether the second condition is satisfied at step S1008. If the second condition is satisfied, the LOV detector 330 determines that the vehicle moves from the ramp to the parking floor and add "1" or "−1" to the LOV at step S913. Herein, which one of "1" and "−1" is added depends on a sign of the slope of the vehicle.

If the LOV detector 180 determines the current LOV, the LOV detector determines whether the ignition switch is turned off at the step S1010. If the ignition switch is not turned off, the method returns to the step S1003 and repeats the step S1003 to the step S1010 to determine whether the vehicle moves to the next parking floor.

If the ignition switch is turned off, the LOV detector 180 determines the finally detected LOV as the parked LOV of the vehicle and informs the information of the determined LOV to the smartphone 400 of the driver to help the driver find out the LOV at step S1011.

While this disclosure has been described in connection with certain embodiments, it is to be understood that the disclosure is not limited to the disclosed embodiments, but, on the contrary, is intended to cover various modifications and equivalent arrangements included within the spirit and scope of the appended claims.

What is claimed is:

1. A level of vehicle (LOV) informing device mounted in a vehicle, the LOV informing device comprising:
    an entrance detector determining whether the vehicle enters an entrance of a parking lot;
    a current location detector detecting a current location of the vehicle;
    an atmospheric pressure detector detecting an atmospheric pressure of the current location of the vehicle;
    a wireless communication unit performing wireless communication with an external device through a wireless communication network; and
    an LOV detector determining an LOV of the vehicle using a difference between a previous atmospheric pressure previously detected by the atmospheric pressure detector and a current atmospheric pressure currently detected by the atmospheric pressure detector, to determine the LOV of the vehicle at a parking time of the vehicle after the vehicle enters the entrance of the parking lot, and informing a user of the LOV,
    wherein the previous atmospheric pressure is an atmospheric pressure at the entrance of the parking lot,
    wherein the current atmospheric pressure is an atmospheric pressure at the current location of the vehicle,
    wherein the LOV detector determines the current location of the vehicle is in a basement when a difference obtained by subtracting the current atmospheric pressure from the previous atmospheric pressure is a negative value, and
    wherein the LOV detector determines the current location of the vehicle is above ground when the difference obtained by subtracting the current atmospheric pressure from the previous atmospheric pressure is a positive value.

2. The LOV informing device of claim 1, wherein the LOV detector:
    determines the LOV of the vehicle as a negative multiple when the difference obtained by subtracting the current atmospheric pressure from the previous atmospheric pressure is a negative multiple of a first predetermined value,
    determines the LOV of the vehicle as (a positive multiple+1) when the difference obtained by subtracting the current atmospheric pressure from the previous atmospheric pressure is a positive multiple of the first predetermined value, and
    determines the LOV of the vehicle as 1 when the difference obtained by subtracting the current atmospheric pressure from the previous atmospheric pressure does not reach a negative first predetermined value or a positive first predetermined value.

3. The LOV informing device of claim 2, wherein the LOV detector determines that the vehicle is parked on a ramp between two LOVs when an absolute value of the difference between the previous atmospheric pressure and the current atmospheric pressure is greater than or equal to a second predetermined value and is less than the first predetermined value.

4. The LOV informing device of claim 2, further comprising a slope detector detecting a slope of ground on which the vehicle is parked,
    wherein the LOV detector determines that the vehicle is parked on a ramp between two LOVs when the slope of the ground on which the vehicle is parked detected by the slope detector at the parking time is greater than or equal to a predetermined slope.

5. The LOV informing device of claim 1, wherein the parking time of the vehicle is one of when a gear stage of the vehicle is positioned at a P-range, when the gear stage of the vehicle is positioned at an R-range, when an ignition switch of the vehicle is turned off, and a combination thereof.

6. The LOV informing device of claim 2, further comprising:
    a vehicle speed detector detecting a vehicle speed; and
    a travel distance detector detecting a consecutive travel distance of the vehicle when an absolute value of the difference between the previous atmospheric pressure and the current atmospheric pressure is less than a second predetermined value that is less than the first predetermined value,
    wherein the LOV detector resets the LOV of the vehicle when a current vehicle speed detected by the vehicle speed detector is greater than or equal to a predetermined speed or when the consecutive travel distance detected by the travel distance detector is greater than or equal to a predetermined travel distance.

7. The LOV informing device of claim 1, wherein,
    the LOV informing device further comprises a slope detector detecting a slope of an atmospheric pressure change based on the current atmospheric pressure and the previous atmospheric pressure, wherein
    the LOV detector detects the LOV of the vehicle using a current slope that is currently detected and a previous slope that is detected before detecting the current slope, and
    the current atmospheric pressure is an atmospheric pressure at the current location of the vehicle and the previous atmospheric pressure is an atmospheric pressure detected at a location of the vehicle before the vehicle reaches the current location.

8. The LOV informing device of claim 7, wherein the LOV detector determines that the vehicle moves from any one LOV to a ramp between two LOVs when:
    an absolute value of the slope of the atmospheric pressure change is continuously greater than or equal to a third predetermined value,
    the slope of the atmospheric pressure change is a positive value or a negative value continuously for a predetermined time or predetermined number of times,
    the absolute value of the slope of the atmospheric pressure change is continuously greater than or equal to the third predetermined value and the slope of the atmospheric pressure change is a positive value or a negative value continuously for the predetermined time or the predetermined number of times, or
    a sum of the absolute value of the slope of the atmospheric pressure change for the predetermined time or the predetermined number of times is greater than or equal to a fourth predetermined value.

9. The LOV informing device of claim 8, wherein the LOV detector determines that the vehicle moves from the ramp between the two LOVs to any one LOV when:

the absolute value of the slope of the atmospheric pressure change is continuously less than a fifth predetermined value, the slope of the atmospheric pressure change changes between a positive value and a negative value for the predetermined time or the predetermined number of times, the absolute value of the slope of the atmospheric pressure change is continuously less than the fifth predetermined value and the slope of the atmospheric pressure change changes between a positive value and a negative value for the predetermined time or the predetermined number of times, or the sum of the absolute value of the slope of the atmospheric pressure change for the predetermined time or the predetermined number of times is less than a sixth predetermined value.

10. A level of vehicle (LOV) informing method using an LOV informing device mounted in a vehicle or a service server, the LOV informing method comprising:

determining whether the vehicle enters an entrance of a parking lot; detecting a current location of the vehicle;

detecting an atmospheric pressure at the current location of the vehicle starting when the vehicle enters the entrance of the parking lot at a predetermined cycle time;

determining an LOV of the vehicle using a difference between a previous atmospheric pressure previously detected and a current atmospheric pressure currently detected;

determining the LOV of the vehicle at a parking time of the vehicle after the vehicle enters the entrance of the parking lot; and informing a user of the LOV to, wherein the previous atmospheric pressure is an atmospheric pressure at the entrance of the parking lot, wherein the current atmospheric pressure is an atmospheric pressure at the current location of the vehicle, wherein the determining of the LOV comprises:

determining the current location of the vehicle is in a basement when a difference obtained by subtracting the current atmospheric pressure from the previous atmospheric pressure at the entrance of the parking lot is a negative value; and determining the current location of the vehicle is above ground when the difference obtained by subtracting the current atmospheric pressure from the previous atmospheric pressure is a positive value, and wherein the determining an LOV further comprises:

determining the LOV of the vehicle as a negative multiple when the difference obtained by subtracting the current atmospheric pressure from the previous atmospheric pressure is a negative multiple of a first predetermined value;

determining the LOV of the vehicle as (a positive multiple+1) when the difference obtained by subtracting the current atmospheric pressure from the previous atmospheric pressure is a positive multiple of the first predetermined value; and determining the LOV of the vehicle as 1 when the difference obtained by subtracting the current atmospheric pressure from the previous atmospheric pressure does not reach a negative first predetermined value or a positive first predetermined value.

11. The LOV informing method of claim 10, further comprising:

detecting a vehicle speed; and detecting a consecutive travel distance of the vehicle when an absolute value of the difference between the previous atmospheric pressure and the current atmospheric pressure is less than a second predetermined value that is less than the first predetermined value, wherein the determining of the LOV further comprises resetting the LOV of the vehicle when the vehicle speed is greater than or equal to a predetermined speed or a consecutive travel distance is greater than or equal to a predetermined travel distance.

12. The LOV informing method of claim 10, the LOV informing method further comprising detecting a slope of an atmospheric pressure change based on the current atmospheric pressure and the previous atmospheric pressure, wherein the determining an LOV is performed using a current slope that is currently detected and a previous slope that is detected before detecting the current slope, the current atmospheric pressure is an atmospheric pressure at the current location of the vehicle, and the previous atmospheric pressure is an atmospheric pressure detected at a location before the vehicle reaches the current location.

13. The LOV informing method of claim 12, wherein the determining of the LOV comprises determining that the vehicle moves from any one LOV to a ramp between two LOVs when:

an absolute value of the slope of the atmospheric pressure change is continuously greater than or equal to a third predetermined value, the slope of the atmospheric pressure change is a positive value or a negative value continuously for a predetermined time or predetermined number of times, the absolute value of the slope of the atmospheric pressure change is continuously greater than or equal to the third predetermined value and the slope of the atmospheric pressure change is a positive value or a negative value continuously for the predetermined time or the predetermined number of times, or a sum of the absolute value of the slope of the atmospheric pressure change for the predetermined time or the predetermined number of times is greater than or equal to a fourth predetermined value.

14. The LOV informing method of claim 13, wherein the determining an LOV further comprises determining that the vehicle moves from the ramp between the two LOVs to any one LOV when:

the absolute value of the slope of the atmospheric pressure change is continuously less than a fifth predetermined value, the slope of the atmospheric pressure change is changed between a positive value and a negative value for the predetermined time or the predetermined number of times, the absolute value of the slope of the atmospheric pressure change is continuously less than the fifth predetermined value and the slope of the atmospheric pressure change changes between a positive value and a negative value for the predetermined time or the predetermined number of times, or the sum of the absolute value of the slope of the atmospheric pressure change for the predetermined time or the predetermined number of times is less than a sixth predetermined value.

* * * * *